United States Patent
Wells et al.

(10) Patent No.: US 11,371,400 B2
(45) Date of Patent: Jun. 28, 2022

(54) SYSTEMS FOR CRANKCASE VENTILATION

(71) Applicant: Ford Global Technologies, LLC, Dearborn, MI (US)

(72) Inventors: Ryan Wells, South Woodham Ferrers (GB); Carl Stephen Newman, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/927,750

(22) Filed: Jul. 13, 2020

(65) Prior Publication Data
US 2022/0010705 A1 Jan. 13, 2022
US 2022/0154607 A9 May 19, 2022

(30) Foreign Application Priority Data

Jun. 28, 2019 (GB) ..................... 1909296

(51) Int. Cl.
*F02M 35/10* (2006.01)
*F02M 26/08* (2016.01)
*F01M 13/00* (2006.01)

(52) U.S. Cl.
CPC .. *F01M 13/0011* (2013.01); *F02M 35/10157* (2013.01); *F02M 35/10222* (2013.01); *F02M 35/10386* (2013.01); *F01M 2250/00* (2013.01)

(58) Field of Classification Search
CPC ............. F02M 35/10222; F02M 26/08; F02M 35/10229; F02M 35/10; F01M 13/00; F01M 13/022; F01M 2013/027
See application file for complete search history.

(56) References Cited

U.S. PATENT DOCUMENTS

| 4,862,860 A | 9/1989 | Shinohara | |
| 6,722,129 B2* | 4/2004 | Criddle | F01M 13/022 123/562 |
| 2004/0069286 A1 | 4/2004 | Knowles | |
| 2005/0022795 A1* | 2/2005 | Beyer | F01M 11/10 73/114.38 |
| 2007/0028903 A1* | 2/2007 | Bruchner | F01M 13/022 123/574 |
| 2012/0312270 A1 | 12/2012 | Kaiser et al. | |
| 2014/0149015 A1* | 5/2014 | Pursifull | F02M 25/06 701/101 |
| 2014/0316676 A1* | 10/2014 | Pursifull | G01N 27/223 701/102 |

(Continued)

OTHER PUBLICATIONS

Great Britain Intellectual Property Office, Combined Search and Examination Report under Sections 17 and 18(3) Issued in Application No. GB1909296.4, dated Nov. 1, 2019, 10 pages.

*Primary Examiner* — Long T Tran
(74) *Attorney, Agent, or Firm* — Vincent Mastrogiacomo; McCoy Russell LLP

(57) ABSTRACT

Systems are provided for a crankcase ventilation system. In one example, a crankcase ventilation (CCV) system for an engine configured to transmit crankcase gases into a clean side air duct, the clean side air duct comprising a sensor and a crankcase ventilation spigot, wherein the crankcase ventilation spigot is configured to be disposed downstream of the sensor, the crankcase ventilation spigot having an outlet configured to direct crankcase gases emerging from the crankcase ventilation spigot away from the sensor.

20 Claims, 2 Drawing Sheets

(56) References Cited

U.S. PATENT DOCUMENTS

| | | |
|---|---|---|
| 2015/0075502 A1 | 3/2015 | Sumilla et al. |
| 2015/0204283 A1* | 7/2015 | VanDerWege ... F02M 35/10157 |
| | | 123/445 |
| 2018/0135479 A1* | 5/2018 | Matsui ............. F02M 35/10268 |
| 2019/0226369 A1* | 7/2019 | Xu ......................... F01M 13/04 |

* cited by examiner

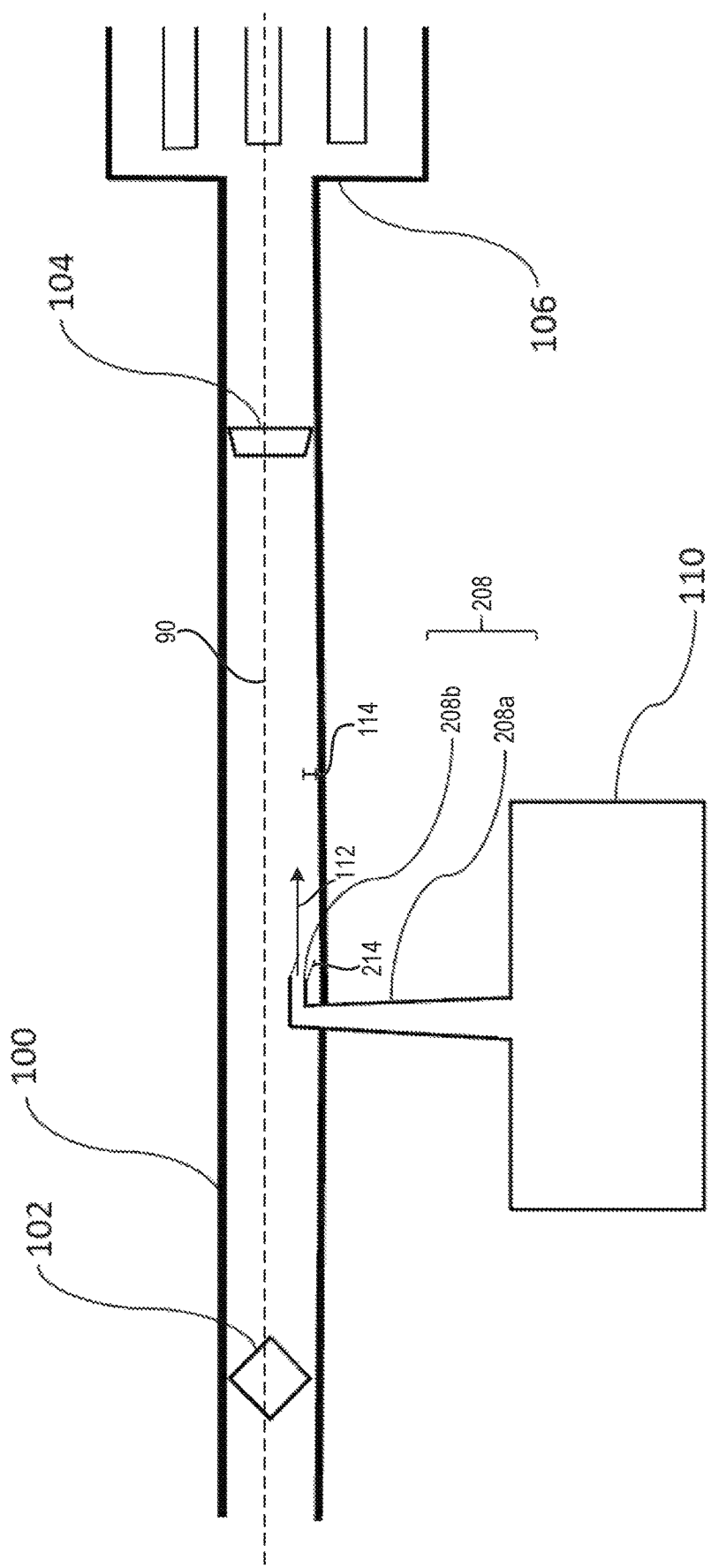

SYSTEMS FOR CRANKCASE VENTILATION

CROSS REFERENCE TO RELATED APPLICATIONS

The present application claims priority to United Kingdom Patent Application No. 1909296.4 filed on Jun. 28, 2019. The entire contents of the above-listed application is hereby incorporated by reference for all purposes.

FIELD

The present description relates generally to a crankcase ventilation system.

BACKGROUND/SUMMARY

Crankcase ventilation (CCV), for example positive crankcase ventilation (PCV), is used to remove gases, e.g. blow-by gases, from an engine's crankcase such that they are blocked from being emitted into the atmosphere. The crankcase vapors may be reintroduced into the intake system, e.g. the clean side air duct, before passing back into the engine cylinders.

Space considerations and package limitations of engines often result in a shortening of the distance between the location at which CCV gases pass into the intake system (the CCV outlet) and the location of an upstream mass air flow (MAF) sensor.

In certain scenarios, for example engine cold-start conditions in warm climates, CCV gases may travel upstream, leading to contamination of the MAF sensor. This may alter engine function, eventually leading to a vehicle diagnostic being triggered indicating a demand to replace a preexisting MAF sensor. This may occur a number of times over a vehicle's lifetime.

In other scenarios, for example in cold ambient temperatures, water vapor within the crankcase ventilation gases or inlet air can begin to freeze at or close to the CCV outlet. Freezing of water vapor at the CCV outlet can block the CCV outlet, causing an undesirable build-up of pressure in the crankcase. To avoid this, CCV outlets are often provided with a heater.

It is therefore desirable to improve the design of CCV systems.

According to an aspect of the present disclosure, there is provided a crankcase ventilation (CCV) system for an engine configured to transmit crankcase gases into a clean side air duct, the clean side air duct comprising a sensor and a crankcase ventilation spigot, wherein the crankcase ventilation spigot is configured to be disposed downstream of the sensor, the crankcase ventilation spigot having an outlet configured to direct crankcase gases emerging from the crankcase ventilation spigot away from the sensor.

The outlet of the CCV spigot may be configured to direct gases emerging from the CCV spigot in a direction having a downstream component. The outlet of the CCV spigot may be configured to direct gases emerging from the CCV spigot downstream.

The CCV spigot may extend into the clean side air duct. The CCV spigot may comprise a bend. The CCV spigot may comprise a first portion and a second portion. The first portion may extend at an angle to the second portion. The first portion may extend substantially at right angles to the second portion.

The clean side air duct may additionally comprise a turbocharger downstream of the CCV spigot. The CCV spigot may be disposed as close to the turbocharger as possible. The CCV spigot may comprise a nozzle configured to accelerate gases emerging from the spigot.

The sensor may be a mass air flow (MAF) sensor. The CCV spigot may be configured to be disposed downstream of the MAF sensor and upstream of both the turbocharger and an intake manifold of the engine, the turbocharger being disposed upstream of the intake manifold.

According to a second aspect of the present disclosure, there is provided a system comprising a crankcase ventilation (CCV) system for an engine configured to transmit crankcase gases into an interior volume of an air duct, the system, comprising a sensor arranged in the interior volume upstream of a crankcase ventilation spigot relative to a direction of intake air flow, wherein the crankcase ventilation spigot comprises an outlet configured to direct crankcase gases emerging from the crankcase ventilation spigot away from the sensor, wherein a diameter of a cross-section of the outlet is reduced relative to other portions of the crankcase ventilation spigot.

The CCV spigot may be configured to direct crankcase gases away from the MAF sensor in a direction having a downstream component. The CCV spigot may comprise a nozzle configured to accelerate gases emerging from the spigot.

According to another aspect of the present disclosure there is provided a crankcase ventilation (CCV) system for an engine configured to transmit crankcase gases into a clean side air duct, the clean side air duct comprising a CCV spigot and a compressor of a turbocharger, wherein the CCV spigot is located upstream of the compressor, the CCV spigot being configured such that crankcase gases emerging from the CCV spigot are directed in a downstream direction towards the compressor.

The flow channel of the CCV spigot may not be linear. The flow channel may comprise a bend, curve, or other non-linear flow path.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 2 is a schematic diagram of a clean side air duct comprising another example of the present disclosure.

DETAILED DESCRIPTION

Figure 1:
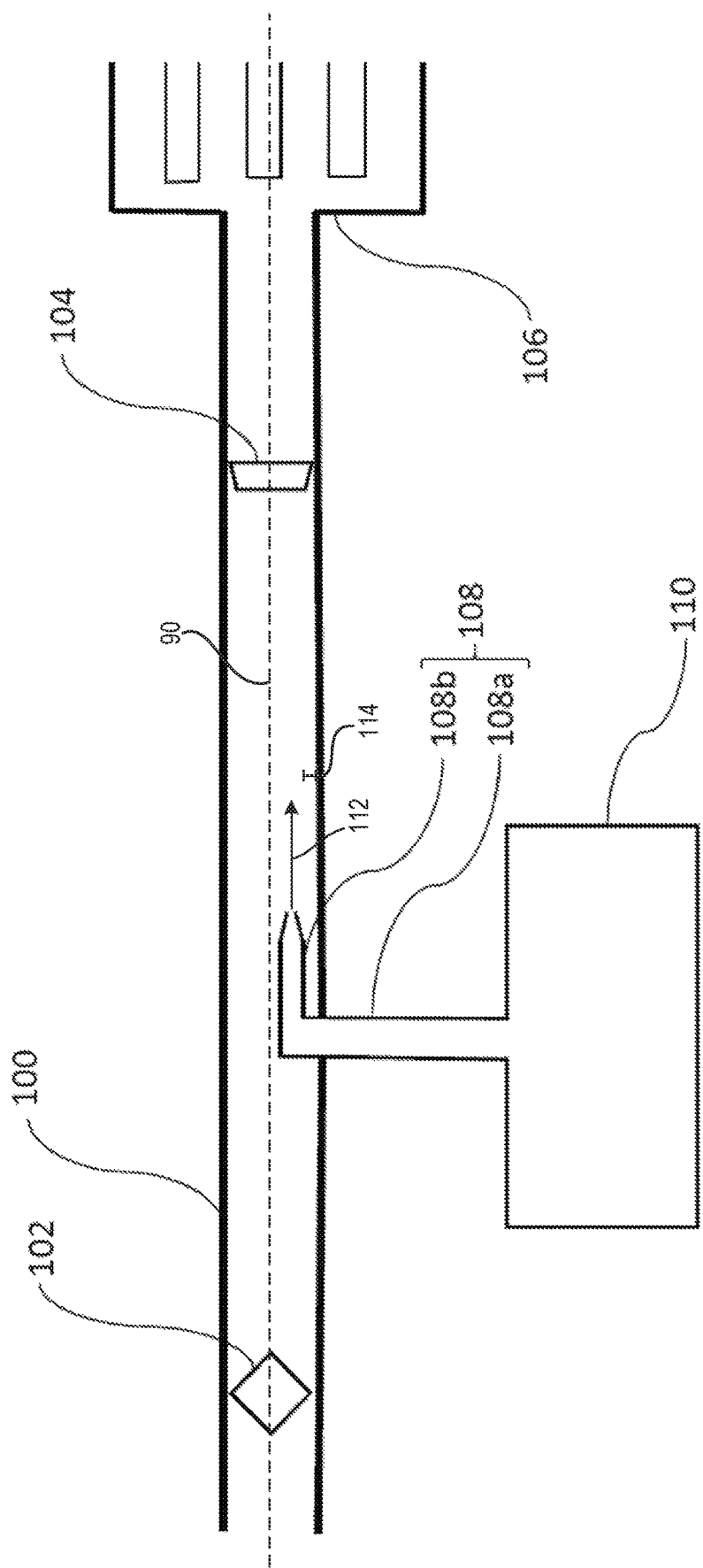
FIG. 1 is a schematic diagram of a clean side air duct comprising one example of the present disclosure.

The following description relates to systems and methods for a crankcase ventilation system comprising a directional spigot disposed downstream of a mass air flow sensor in a clean side air duct of an engine.

FIGS. 1 and 2 show a clean side air duct 100 configured to transmit (from left to right in FIGS. 1 and 2) clean air into the intake manifold 106 of an engine. The air duct 100 comprises a mass air flow (MAF) sensor 102, disposed upstream of the intake manifold 106. The air duct 100 may also comprise a compressor 104 of a turbocharger, the compressor 104 being disposed upstream of the intake manifold 106 and downstream of the MAF sensor 102.

The MAF sensor 102 may be configured to determine the mass air flow through the air duct 100 such that suitable ratios of air and combustion material are combined in the cylinders (not shown) for combustion.

The compressor 104, if present, is powered by a turbine driven by exhaust gases leaving the engine, compressing the gas entering the cylinders via the intake manifold 106. As such, the gas downstream of the compressor 104 within the air duct 100 may be at a higher pressure than gases upstream of the compressor 104.

Also shown in FIGS. 1 and 2 is a CCV spigot 108, disposed proximally to the air duct 100. The CCV spigot 108 comprises a first portion 108a, and a second portion 108b. The first portion 108a and the second portion 108b may be continuously and fluidically connected such that they are contiguous and the first portion 108a merges into the second portion 108b after a certain point. The CCV spigot 108 is in fluidic communication with the crankcase 110, such that the CCV spigot 108 may form an outlet for gases present in the crankcase 110.

The second portion 108b extends at least partially within the air duct 100 such that the second portion 108b is able to direct gases leaving the CCV spigot 108. The second portion 108b extends within the air duct 100 in a downstream direction. The flow from the CCV spigot 108 may be parallel to the longitudinal axis (not shown) of the air intake duct 100. Alternatively, the flow from the CCV spigot 108 may direct CCV gases towards a particular feature downstream.

In the case that the air duct 100 comprises the compressor 104, the CCV spigot 108 is disposed upstream of the compressor 104. The second portion 108b may direct gases towards a feature of the compressor 104, such as the inducer face (not shown), where the highest angular velocity of the compressor is achieved.

The CCV spigot 108 may comprise a bend along its path, for example a right-angled bend.

The location of the bend may coincide with the point at which the first portion 108a merges into the second portion 108b and/or the point at which the CCV spigot 108 passes into the intake duct 100. The bend causes a significant redirection of the longitudinal axis of the CCV spigot 108 such that the second portion 108b may be able to substantially align with the longitudinal axis of the air duct 100.

Additionally, the CCV spigot 108 may contain a portion of tapered cross section such as a nozzle, for example of conical cross section, such that gases may be accelerated when passing through the tapered portion. This tapered portion may act as a venturi, thereby accelerating the CCV gases. In FIG. 1, the tapered portion is disposed within the second portion 108b proximally to the point at which the spigot 108 terminates, whilst the first portion 108a is shown to be of constant cross section and diameter. In FIG. 2, the tapered portion is disposed within the first portion 108a, such that the spigot 108 is of constant cross section which may be equal in diameter to the narrowest part of the tapered portion. In FIG. 1, the acceleration and directing of gases are both achieved in the second portion 108b.

In one example, the first portion 108a of the CCV spigot 108 comprises a uniform diameter extending from the crankcase 110 to the air duct 100. The second portion 108b extends from the first portion 108a in an interior volume of the air duct 100. In one example, the second portion 108b is arranged in a region of the interior volume of the air duct 100 distal to a central axis 90 of the air duct 100 such that a flow of crankcase gases 112 is offset with the central axis 90. In some examples, additionally or alternatively, the second portion 108b may be aligned with the central axis 90.

The second portion 108b comprises a flow restriction adjacent to its outlet. That is to say, a diameter of the second portion 108b reduces toward its outlet such that a cross-sectional area of the second portion 108b is gradually reduced, resulting in an increased crankcase gas velocity into the interior volume of the air duct 100.

As illustrated, the second portion 108b is spaced away from a nearest interior surface of the air duct 100 by a distance 114. The distance 114 may be based on a portion of a length of the second portion 108b or a portion of a length of the first portion 108a extending into the air duct 100. As described above, the length of the first portion 108a arranged in the air duct 100 is less than a radius of the air duct 100.

In one example, the second portion 108b is arranged such that its outlet is five times a length of the second portion 108b to an inlet of the compressor 104. Additionally or alternatively, the second portion 108b may be within twice its length of the inlet of the compressor 104. In one example, a distance between the second portion 108b and the inlet of the compressor 104 is optimized such that a mixing between intake air and crankcase gases may still occur while a draw of the compressor 104 on the crankcase gases is sufficient to block crankcase gases from reaching the MAF sensor 102.

In FIG. 2, acceleration of gases is achieved in a first portion 208a, a second portion 208b of a CCV spigot 208 providing an arrangement for directing the gases is a downstream direction. In one example, the CCV spigot 208 may be used identically to the CCV spigot 108 of FIG. 1. As a further alternative, both portions 208a, 208b may comprise tapered cross sections. In one example, the CCV spigot 208 may taper from a diameter of 15 millimeters at its broadest to 11 millimeters at its narrowest.

During engine operation, gases and vapors emanating from the crankcase, e.g. blow-by combustion material and/or leaked exhaust gases, are released into the crankcase 110. Accumulation of these gases causes them to travel into the CCV spigot 208; firstly, into the first portion 208a and then into the second portion 208b, before passing into the air intake duct 100. As the end of the second portion 208b is aligned with the longitudinal axis of the air intake duct 100, the CCV gases are directed in a downstream direction, for example towards the intake manifold 106, and optionally towards the turbocharger 104, such that upstream travel of the gases is less likely.

The CCV spigot 208 may be angled towards a wall of the air duct 100 such that CCV gases 112 are directed towards the wall of the air duct 100 when exiting the second portion 208b. An example of the angle is illustrated via dashed lines 214. It has been determined that this may initiate or enhance a natural swirl within the air duct 100, allowing improved merging with the gas flow already passing through the air duct 100. That is to say, the second portion 208b, may be angled relative to the central axis 90 such that CCV gases 112 are directed directly to a nearest surface of the air duct 100. The CCV gases 112 collide with the surface, and begin to tumble, which may enhance mixing between the CCV gases and gases flowing toward the compressor 104.

As the crankcase vapors exit the CCV spigot 208, the tapering in internal cross sectional area, if present, causes the CCV gases to be increased to a speed which may be greater than that of the gas passing through the air duct 100 with which the CCV gases are merging. In this way, the likelihood of CCV gases travelling upstream is further reduced.

It is emphasized that the CCV spigot 208 of the present disclosure is constructed and located so as not to change the pressure within the crankcase 110, whether by drawing a vacuum within the crankcase 110 via fluid flow past the second portion 208b or by other means. Instead, the CCV spigot 208 of the present disclosure, may passively allow crankcase vapors to pass into the air duct 100 whilst allowing for an acceleration of the crankcase vapors in a downstream direction such that the likelihood of travel upstream and/or contamination of the MAF sensor 102 is significantly reduced.

With modern engines, the quantity of blow-by gases leaked into the crankcase 110 is reduced, meaning there may be insufficient accumulation of CCV gases within the crankcase 110 to cause the gases to pass into the CCV spigot 208. This may lead to a stagnation of flow within the CCV spigot 208. In this case, if the CCV spigot 208 is located upstream of the compressor 104, the compressor may draw CCV gases into the air duct 100 via a partial vacuum generated in the air duct 100 upstream of the compressor 104.

The present disclosure may be particularly beneficial in engines with package limitations that demand the CCV spigot to join the air duct 100 in close proximity to the MAF sensor 102. The CCV spigot of the present disclosure may be retro-fitted to such existing engines, eliminating the periodic need to replace the MAF sensor 102.

The second portion 208b that extends within the air duct 100 can be tuned according to the engine to which the CCV spigot 208 is being fitted, such that the spigot does not cause any changes in functioning or performance of the engine or its components. For example, the spigot 208 may be tuned by adjusting its length such that it terminates closer the compressor 104 than illustrated. Additionally or alternatively, the spigot 208 may be adjusted in length such that it extends minimally within the air duct 100 only to the extent that it is able to direct the crankcase vapors in the correct direction. That is to say, the second portion may extend flush against a surface of the air duct 100 so that it minimally impedes gas flow therethrough. Likewise, the depth of the protrusion, e.g. how far radially into the air duct 100 the second portion extends, can be adjusted to ensure the desired flow rates and/or gas velocity and/or noise characteristics are achieved.

Similarly, the length, dimensions and degree of narrowing of the tapered portion may be adjusted according to the specific engine type to which the CCV spigot 208 is being fitted.

In one example, the CCV spigot comprises a valve configured to adjust crankcase gas flow therethrough. In one example, a position of the valve may be adjusted in response to intake air flow, compressor speed, engine speed, crankcase pressure, and the like. For example, the valve may be moved to an open position in response to a compressor speed being greater than a threshold speed. Alternatively, the valve may be moved to a less open position or a closed position in response to the compressor speed being less than the threshold speed.

Whilst the present disclosure has been described in the context of the MAF sensor 102, it will be understood by the skilled person that the present disclosure may equally be applicable to other components which are adversely affected by impingement of blow-by gases or other contaminants. Similarly, the present invention may be applicable to the transmission of other gases within an engine where it is desirable to prevent backflow.

The engine may be a stationary engine or may be fitted to a vehicle such as a motor vehicle (e.g. car, van, truck, motorcycle etc.), industrial or agricultural vehicles (e.g. tractor, forklift, bulldozer, excavator, etc.), marine vessel, aircraft or any other type of.

The CCV spigot of the present disclosure allows crankcase pressure to be maintained at a suitable level, whilst reducing the quantities of pollutants being emitted into the atmosphere by passing crankcase gases through the engine's exhaust emission control and/or after-treatment devices (not shown), and reducing the likelihood of contamination of upstream components.

It is appreciated by the present disclosure that it is desirable to eliminate the necessity for a heater in a CCV system. Heaters have a number disadvantages associated with them, such as initial cost, ongoing cost due to energy consumption, increased drain on the vehicle's battery, and additional weight added to the vehicle.

In one example, directing CCV gases substantially in parallel with the longitudinal axis of the air duct 100, and/or a CCV spigot comprising a portion of tapered cross section, removes the tendency for ice to form at the point at which the CCV spigot joins the air duct 100. The present disclosure thus obviates the desire for a heater, conferring significant advantages on the engine and vehicle within which it may be installed.

Tests have shown that the CCV spigot is effective in blocking ice formation and/or freezing-over at ambient temperatures of minus 15° C.

Additionally, the CCV spigot may reduce turbulent flow of CCV gases within the air duct 100.

In the example of FIG. 2, the first portion 208a of the spigot 208 comprises a cross-sectional flow through area that is reduced from the crankcase 110 toward the air duct 100. The second portion 208b of the spigot 208 may comprise a uniform diameter. In some examples, the second portion 208b may be angled such that a direction of crankcase gas flow 112 is not parallel to the central axis 90 of the air duct 100. In one example, the direction of crankcase gas flow 112 is angled away from the central axis 90 and toward a surface of the air duct 100.

In one example, an engine system, comprises an intake passage comprising a mass air flow sensor and a turbocharger. A crankcase is fluidly coupled to the intake passage via a spigot arranged between the mass air flow sensor and the turbocharger. The spigot is configured to direct crankcase gases directly into an interior volume of the intake passage (e.g., air duct 100 of FIGS. 1 and 2) in a direction towards the turbocharger.

The spigot comprises a first portion and a second portion. The first portion extends from a crankcase and extends through a surface of a pipe of the intake passage and protrudes into the intake passage. The second portion is entirely arranged in the interior volume of the intake passage. A length of the first portion protruding into the intake passage is less than a radius of the intake passage. The second portion is normal to the first portion and parallel to a direction of intake air flow through the intake passage. Additionally or alternatively, the second portion is angled to the first portion and the direction of intake air flow through the intake passage. The second portion is angled toward the surface of the intake pipe, wherein one of the first portion or the second portion comprises a tapered cross-sectional flow-through area reducing in a direction of crankcase gas flow.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a spigot of a crankcase is configured to promote crankcase gas flow toward an intake manifold and further limit a likelihood of crankcase gases from reaching a sensor arranged upstream of the spigot. In one example, the spigot comprises a cross-sectional flow through area that becomes smaller in a direction of crankcase gas flow from the crankcase to the air duct. The technical effect of reducing a diameter of the spigot in a direction of crankcase gas flow is to increase a crankcase gas flow speed, thereby enhancing its mixing and other flow characteristics into the air duct.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising a crankcase ventilation (CCV) system for an engine configured to transmit crankcase gases into an interior volume of an air duct, the system, comprising:
    a sensor arranged in the interior volume upstream of a crankcase ventilation spigot relative to a direction of intake air flow; wherein
    the crankcase ventilation spigot comprises an outlet configured to direct crankcase gases emerging from the crankcase ventilation spigot away from the sensor, wherein a diameter of a cross-section of the outlet through which crankcase gases exit and enter the air duct is reduced relative to other portions of the crankcase ventilation spigot.

2. The system of claim 1, wherein the crankcase ventilation spigot comprises a first portion extending from a crankcase and into the interior volume of the air duct, wherein the outlet is arranged on a second portion extending at an angle from the first portion.

3. The system of claim 2, wherein an entirety of the second portion is arranged within the interior volume of the air duct.

4. The system of claim 2, wherein a length of the first portion extending into the air duct is less than a radius of the air duct.

5. The system of claim 2, wherein the crankcase ventilation spigot comprises a bend.

6. The system of claim 2, wherein the angle is equal to 90 degrees and the second portion extends in a direction parallel to the direction of intake air flow.

7. The system of claim 2, wherein the angle is less than 90 degrees and the second portion extends toward a nearest interior surface of the air duct.

8. The system of claim 2, wherein the crankcase ventilation spigot is disposed adjacent to a turbocharger.

9. The system of claim 2, wherein a cross-sectional flow through area of the second portion is reduced along its length in a direction of crankcase gas flow.

10. The system of claim 1, wherein the sensor is a mass air flow (MAF) sensor.

11. A engine system, comprising:
an intake passage comprising a mass air flow sensor and a turbocharger; and
a spigot arranged between the mass air flow sensor and the turbocharger, wherein the spigot is configured to direct crankcase gases directly into an interior volume of the intake passage in a direction towards the turbocharger, and wherein the spigot extends away from a wall of the intake passage, and wherein an outlet of the spigot is tapered via only surfaces of the spigot in a direction of intake air flow.

12. The engine system of claim 11, wherein the spigot comprises a first portion and a second portion, wherein the first portion extends from a crankcase case, extends through a surface of a pipe of the intake passage, and protrudes into the intake passage, and wherein the second portion is entirely arranged in the interior volume of the intake passage.

13. The engine system of claim 12, wherein a length of the first portion protruding into the intake passage is less than a radius of the intake passage.

14. The engine system of claim 12, wherein the second portion is normal to the first portion and parallel to a direction of intake air flow through the intake passage.

15. The engine system of claim 12, wherein the second portion is angled to the first portion and the direction of intake air flow through the intake passage.

16. The engine system of claim 15, wherein the second portion is angled toward the surface of the pipe, wherein one of the first portion or the second portion comprises a tapered cross-sectional flow-through area reducing in a direction of crankcase gas flow.

17. A system, comprising:
a crankcase fluidly coupled to an intake passage via a spigot, wherein the spigot comprises a first portion extending from the crankcase into an interior volume of the intake passage and a second portion extending from the first portion within the interior volume, wherein one of the first portion or the second portion comprises a tapered cross-sectional flow-through area reducing in a direction of crankcase gas flow out of the spigot and into the intake passage, and wherein the second portion is spaced away from walls of the intake passage.

18. The system of claim 17, wherein the first portion comprises the tapered cross-sectional flow-through area, wherein the first portion is tapered along its entire length.

19. The system of claim 17, wherein the second portion comprises the tapered cross-sectional flow-through area, wherein the second portion is tapered only along a portion of its entire length including its outlet.

20. The system of claim 17, wherein the second portion is arranged entirely in the intake passage between a mass air flow sensor and a turbocharger, wherein the second portion extends in a direction of intake air flow toward the turbocharger.

* * * * *